United States Patent
Kota et al.

(10) Patent No.: US 7,003,318 B2
(45) Date of Patent: Feb. 21, 2006

(54) MOBILE PHONE WITH CAMERA

(75) Inventors: Yuichiro Kota, Tokyo (JP); Minoru Ikeda, Inagi (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 10/373,019

(22) Filed: Feb. 26, 2003

(65) Prior Publication Data

US 2004/0204065 A1    Oct. 14, 2004

(30) Foreign Application Priority Data

Sep. 20, 2002    (JP)    ............................. 2002-274282

(51) Int. Cl.
    *H04M 1/00*    (2006.01)
(52) U.S. Cl. ............... 455/556.1; 455/90.3; 455/550.1; 455/575.1; 455/575.3; 348/376
(58) Field of Classification Search ...... 455/90.1–90.3, 455/550.1, 556.1, 575.1–575.3; 348/373, 348/374, 376; 352/176, 177; 345/629
    See application file for complete search history.

(56) References Cited

U.S. PATENT DOCUMENTS

| 6,259,457 B1 * | 7/2001 | Davies et al. ............... 345/629 |
| D477,581 S * | 7/2003 | Iijima et al. ............... D14/138 |
| 2002/0077145 A1 * | 6/2002 | Kamiya et al. ............. 455/550 |
| 2002/0142798 A1 * | 10/2002 | Miyake ....................... 455/556 |
| 2002/0160724 A1 * | 10/2002 | Arai et al. .................... 455/90 |
| 2003/0036365 A1 * | 2/2003 | Kuroda ......................... 455/90 |
| 2003/0040346 A1 * | 2/2003 | Fukuda et al. ............. 455/575 |
| 2003/0122957 A1 * | 7/2003 | Emme ........................ 348/370 |

FOREIGN PATENT DOCUMENTS

| GB | 2358984 | * | 8/2001 |
| JP | 10336498 | * | 1/1999 |
| JP | 2000-253124 | | 9/2000 |
| JP | 2001-320463 | | 11/2001 |

* cited by examiner

*Primary Examiner*—William Trost
*Assistant Examiner*—Stephen M. D'Agosta
(74) *Attorney, Agent, or Firm*—Mattingly, Stanger, Malur & Brundidge, P.C.

(57) ABSTRACT

A mobile telephone with a camera function has an optimum shooting posture and optimum storage ability. The mobile telephone has a first housing and a second housing which are so connected by a hinge to enable longitudinal folding. A main display section has an operation section containing a set of a ten-key pad and functional keys, which are respectively provided on the inner surfaces of the first and second housings and are invisible when the housings are folded. A subsidiary display section and a camera section are respectively provided on the outer surfaces opposite to the inner surfaces and a shutter switch and a phone to camera changeover switch are provided on the outer surface of the housings.

3 Claims, 6 Drawing Sheets

MOBILE PHONE WITH CAMERA

BACKGROUND OF THE INVENTION

1. Field of the Invention

The present invention relates to a mobile telephone that is equipped with a camera function and can be folded in two. More particularly, the present invention relates to a mobile telephone that enables the user to shoot while viewing a photo image.

2. Prior Art

Recently mobile telephones comprising two housings hinged to be folded have been prevailing. Particularly, such mobile telephones with a camera function and an image transmitting function have been highlighted.

Some foldable mobile telephones with a camera function provide a camera section on the outer surface. or on the hinge section. Each of such mobile telephones is so constructed as to expose the main display when the mobile telephone is opened outward. The main display shows a picture image taken by the camera section. The user shoots while monitoring the picture image on the main display. (See Japanese Application Patent Laid-Open Publication No. 2000-253124.) Contrarily, an unfoldable mobile telephone has a main display on the front surface, and has a camera section on the rear surface. The user can shoot monitoring picture images on the display while holding the mobile telephone with its longitudinal axis kept horizontally. (See Japanese Application Patent Laid-Open Publication No. 2000-253124.)

SUMMARY OF THE INVENTION (Problems to be Solved by the Invention)

For a mobile telephone disclosed in the above Publicly-Known Document 1, the user must open the clamshell style mobile telephones to shoot pictures. Generally, a camera is respectively held by both hands with its longitudinal axis horizontal to prevent picture blurring in shooting. However, a mobile telephone with a camera is held by a single hand with the longitudinal axis of one of the opened housings vertical and the other housing in hand. This shooting posture by a single hand may easily cause unsteady shooting.

Contrarily, as a publicly unfoldable mobile telephone can take the conventional shooting position, it can reduce unsteady shooting, but it has the display and operational switches exposed to the outside. These may be operated involuntarily and cannot be stored easily.

An object of the present invention is to provide a mobile telephone with camera which enables stable shooting posture and proper storage.

(Means for Solving the Problems)

To accomplish said object, the present invention provides a mobile telephone comprising a first housing equipped with a plurality of operational switches, a second housings with a main display section, and a hinge means which pivotally connects said first and second housings and enables longitudinal folding thereof, wherein, a main display section and an operation section containing a set of a ten-key pad and functional keys, which are respectively provided on the inner surfaces of said first and second housings which are invisible when the housings are folded, a subsidiary display section and a camera section are respectively provided on the outer surfaces opposite to said inner surfaces of said housings, a shutter switch and a changeover switch which switches between Phone and Camera modes are provided on the outer surface of said housings, and said subsidiary display section displays a communication status in the Phone mode and a picture image shot by said camera section in the Camera mode.

DETAILED DESCRIPTION OF THE INVENTION (Description of the Preferred Embodiments)

A preferred embodiment of the present invention is described below with reference to accompanying drawings FIG. 1 to FIG. 6.

Figure 1A:
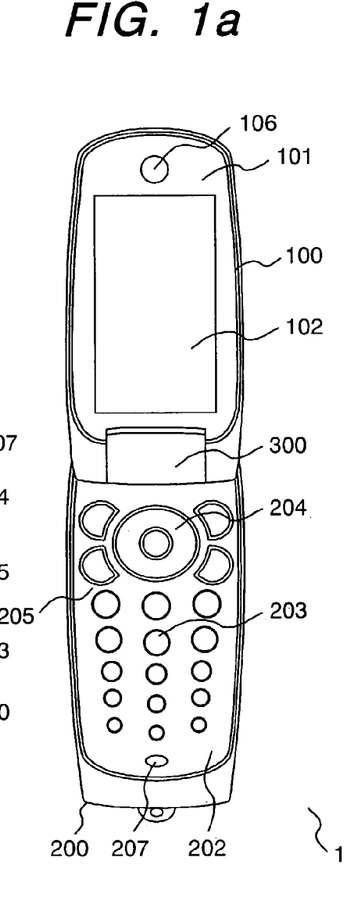
FIG. 1 shows outlined external views of a mobile telephone which is an embodiment of the present invention.
Figure 1B:
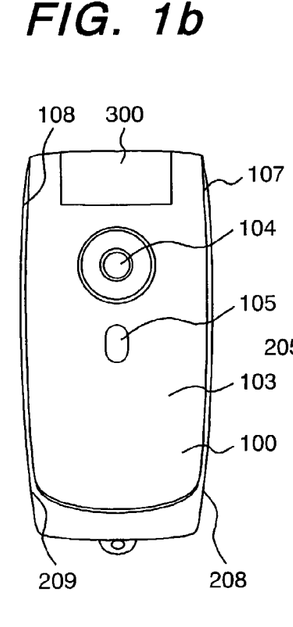
Figure 1C:
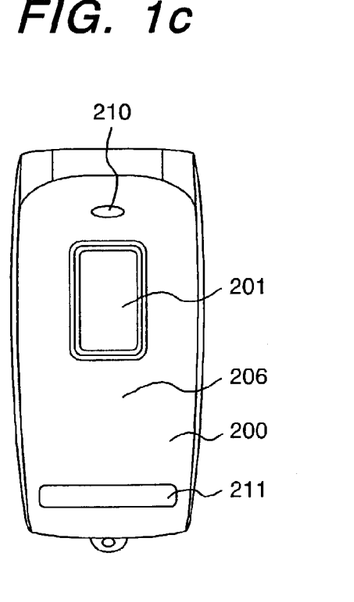
Figure 2:
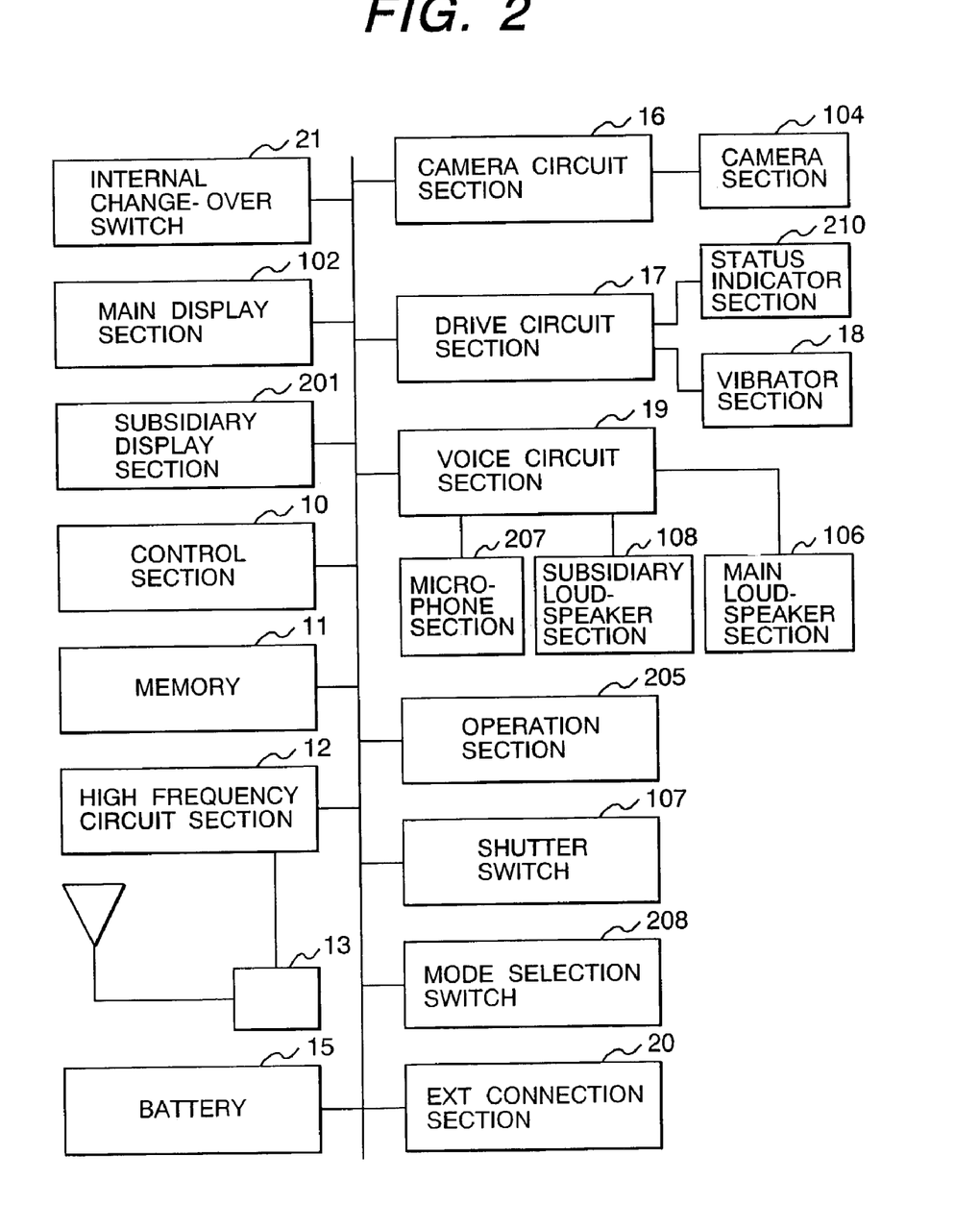
FIG. 2 shows a functional block diagram of the mobile telephone which is an embodiment of the present invention.
Figure 3:
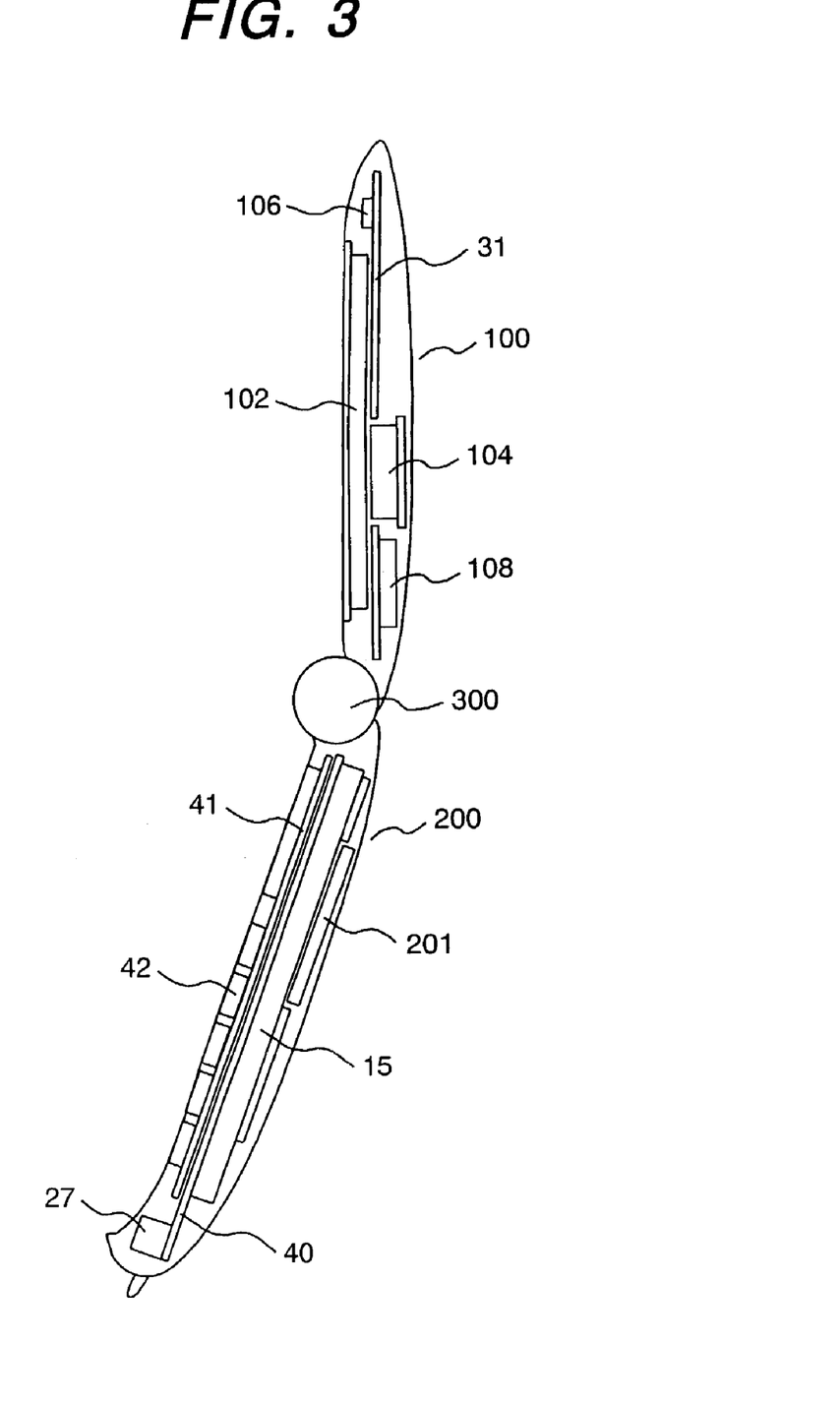
FIG. 3 is a lateral sectional view of the mobile telephone whose first casing is open.
Figure 5A:
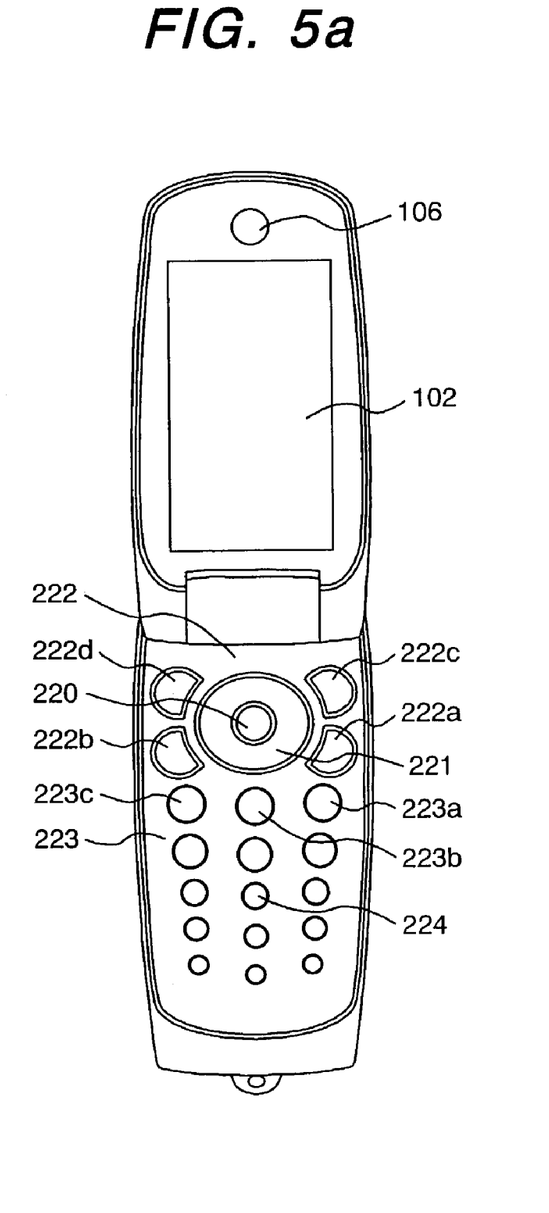
FIG. 5 shows front and side views of the mobile telephone whose first casing is open.
Figure 5B:
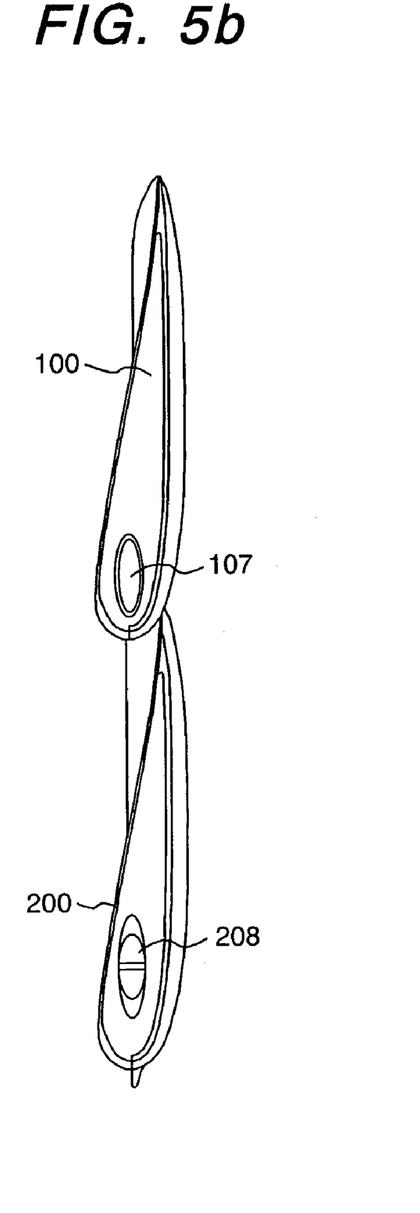
Figure 6A:
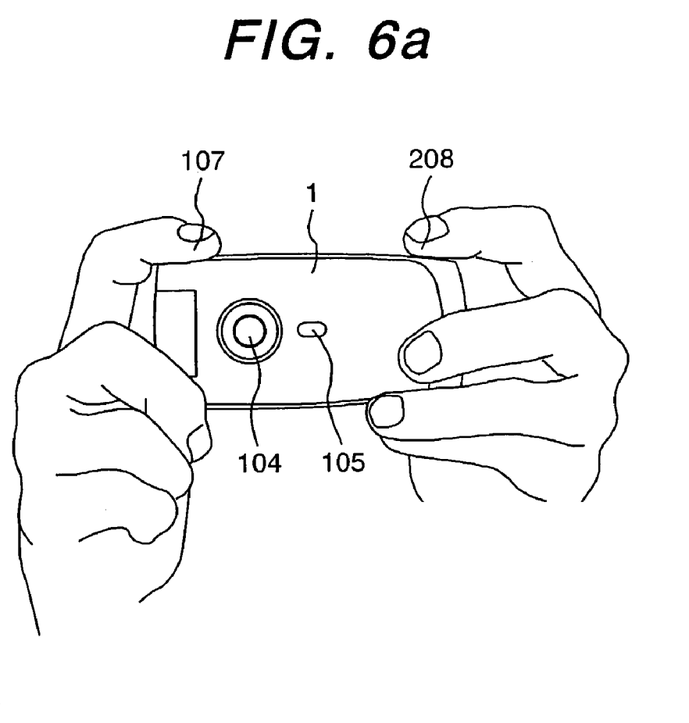
FIG. 6 shows how the mobile telephone is held to shoot pictures.
Figure 6B:
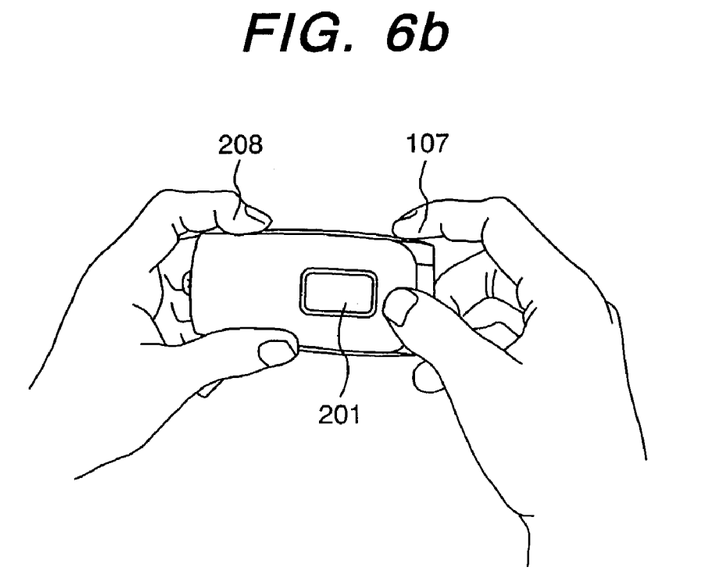

FIG. 1 shows outlined external views of a mobile telephone (cellular phone) which is an embodiment of the present invention. FIG. 1(*a*) is a front view of the mobile phone which is open. FIG. 1(*b*) is a front view of the mobile telephone whose first casing is closed. FIG. 1(*c*) is a rear view of the second housing. FIG. 2 shows the functional block diagram of the mobile telephone. FIG. 3 is a lateral sectional view of the mobile telephone whose first casing is open. FIG. 4 shows external views of the mobile telephone whose first casing is closed. FIG. 5 shows front and side views of the mobile telephone whose first casing is open. FIG. 5(*a*) is a front view of the open mobile telephone and FIG. 5(*b*) is a right-side view of the open mobile telephone. FIG. 6 shows how the mobile telephone is held to shoot pictures. FIG. 6(*a*) is a view of the mobile telephones viewed from an object to be shot. FIG. 6(*b*) is a view of the mobile telephones viewed from the user who is going to shoot.

Referring to FIG. 1, the structure of the mobile telephone (cellular phone) in accordance with the present invention is outlined below. In FIG. 1, a member given a number 1 is a mobile telephone equipped with a camera function. Mobile telephone (1) comprises first housing (100) equipped with a display function, second housing (200) equipped with a control function, an operating function, and a battery, and hinge section (300) which pivotally connects said first and second housings so that they can be folded. Said first and second are respectively flat in appearance and approximately match with each other when the housings are closed. The longitudinal ends of these two housings (100 and 200) are connected by means of the hinge section (300). When these housings (100 and 200) are opened, they form a longitudinal member fit for phone communication (which is called a first status). When these housings (100 and 200) are folded to close, they become so compact for storage. The mobile telephone in accordance with the present invention has been designed to enable the user to shoot with the mobile telephone closed while monitoring a target picture image on the subsidiary display (201). Therefore, the mobile telephone can take a preferable shooting posture, that is, a landscape posture with its longitudinal axis horizontal (which is called a second status).

In other words, the first housing (100) of this mobile telephone (1) has an inner surface (101) which is invisible when the housings are folded to close. The inner surface is equipped with a main display section (102). The outer surface (103) of the first housing (101) is equipped with a camera section (104) and a photoflash (105).

The second housing (200) of this mobile telephone has an operation section (205) containing a set of a ten-key pad (203) and functional keys (204) on the inner surface (292) of said second housing which is invisible when the housings are closed. A subsidiary display section (201) is provided (arranged) on the outer surface (206) of the second housing.

The free end (which is opposite to the hinged end 300) of the first housing has a loudspeaker section (106), and the free end of the second housing has a microphone section (207). A camera shutter (107) is provided to the left side of the hinge section (300) on the first housing (100). A mode selection switch (208) to switch between Phone and Camera modes is provided on the left side of the second housing (200) far away from the hinge section (300). Further, a subsidiary loudspeaker 108 is provided on the right side of the hinge section (300) of the first housing, and a button (209) is provided on the right side of the second housing (200) far away from the hinge section (300) to open the first housing (100).

In accordance with the present invention, as the loudspeaker (106) and the microphone section (207) are respectively provided on the longitudinal ends of the whole mobile telephone in the first status, the user can get an optimum telephony posture of the mobile telephone by bending the mobile telephone properly so that the loudspeaker (106) and the microphone section (207) may come to the ear and mouth of the user. In the second status, the user can hold the mobile telephone (1) with its longitudinal axis horizontal and with its camera shutter (107) on the upper side of the folded mobile telephone in the same manner as the user operates a shutter of an ordinary camera. Further in the second, as the folded mobile telephone has the subsidiary display section (201) faced to the user who is going to shoot, and the camera section (104) faced to an object to be shot, the user can shoot while monitoring a picture image of the object on the subsidiary display section (201). Furthermore in this second status, the user can hold the mobile telephone like an ordinary camera (in a normal landscape posture) and shoot pleasantly without causing picture blurring in shooting.

The subsidiary display section (201) shows a normal upright picture image in the second mode (in which the mobile telephone is held in the horizontal posture), the communication status in the Phone mode, and a picture image taken by the camera section in the Camera mode.

This embodiment enables shooting even in the first status. In this case, the control section (10) in FIG. 2 checks a signal of "the mobile telephone is open" given from an internal changeover switch provided on the hinge section (300). When the signal is "the mobile telephone is open", the control section turns a picture image taken by the camera section (104) by 90 degrees and displays it on the main display section (102).

As explained above, this embodiment in the first status enables the user to hold the second housing (200) by a single hand to shoot. In the second status, this embodiment enables the user to hold the folded mobile telephone (1) with two hands like an ordinary camera. In either status, the user can shoot while monitoring a picture image on the main display section (102) or the subsidiary display section (201).

The mobile telephone (1) which is an embodiment of the present invention will be described in further detail by way of example with reference to FIG. 2 to FIG. 6.

Referring to FIG. 2, the configuration of the mobile telephone (1) is explained. In FIG. 2, various components and switches are connected to the control section (10) that collectively controls the mobile telephone (1) via a bus.

The internal changeover switch (21) is provided on the hinge section (300) and originates signals according to opening and closing of the first housing (100). Memory (11) stores programs and data. The control section (10) uses the programs to control the mobile telephone (1). The high frequency circuit section (12) is a communication means, and an internal antenna (13) is connected to this section (12). The battery (15) supplies power to the mobile telephone (1). The camera section (104) is connected to the bus via the camera circuit section (16).

To the drive circuit section (17) are connected a vibrator section (18) that vibrates the mobile telephone when a call comes to the mobile telephone and a status indicator section (210) that indicates call reception and alarm status by light. The control section (10) controls the quantity and pattern of operation thereof. The main loudspeaker section (106), the microphone section (207), and the subsidiary loudspeaker section (108) are connected to the voice circuit section (19).

This embodiment is equipped with the operation section (205), the shutter switch (107), and the mode selection switch (208). These switches enable the user to operate the mobile telephone (1). The mode selection switch (208) enables the subsidiary display section (201) to be shared by the Phone mode and the Camera mode (Still Picture mode and Motion Picture mode). This can reduce the number of parts in the mobile telephone and consequently reduce the production cost of the mobile telephone. In addition, this embodiment is equipped with the EXT connection section (20) which enables the mobile telephone to be connected to an external personal computer by cord for communication and data exchange.

Referring to FIG. 3, the internal layout of the mobile telephone will be explained below. In FIG. 3, the first housing (100) consists of an inner cover and an outer cover which are made of resin material. The space between the covers contains a main display section (102) and a subsidiary printed circuit board (31) on a main chassis (not shown). The subsidiary printed circuit board (31) has an opening into which a camera section (104) is placed. This can make the first housing (100) thinner. A shutter switch (107) and a subsidiary loudspeaker section (108) are placed on both sides of the subsidiary printed circuit board (31) respectively without any connecting wires. This also enables disposition of large operational buttons on the thin housing. Additionally, this subsidiary printed circuit board (31) is equipped with a camera flash (105), a main loudspeaker section (106) and related control means for the main display section (102) and operational switches. The subsidiary printed circuit board (31) is connected to the main printed circuit board (40) of the second housing with cords. Further, the main chassis mounts a hinge mechanism (not shown) that constitutes the hinge section (300) and connected to the second housing by means of this hinge mechanism.

The second housing (200) consists of an inner cover and an outer cover which are made of resin material. In a space between the covers, an operation printed circuit board (41), a main printed circuit board (40) consisted from a multiboard and a thin type battery are arranged. The operation printed circuit board (41) is provided adjacent to a key sheet whose projections protrude outwards from openings formed on the inner cover. A contact is provided, under each projection, on the operation printed circuit board. When each of the projections is pressed, a related operation is enabled.

In this embodiment, the main printed circuit board (40) consists of a front board and a rear board. A battery (15) is arranged between the front and rear main printed circuit boards (40). The battery (15) is a card-shaped thin battery and can be mounted and demounted through a slot (211) formed on the outer surface (206) of the second housing (200). The front main printed circuit board (40) mainly contains an operation-related circuit. The rear main printed circuit boards 40 has an opening in which the subsidiary display section (201) is placed to make the second housing thinner. Further, this main printed circuit board (40) is equipped with the controller section (10), the high frequency circuit section (12), and the status indicator section (210). In addition, the mode selection switch (208), the OPEN button (209), and the external connector (20) are provided on both sides of the main printed circuit board (40) or the operation printed circuit board (41) in a dispersed manner. This enables provision of large operation buttons and an easy-to-connect external connector (20).

Referring to FIG. 4 and FIG. 5, the external view of the mobile telephone (1) are explained below. The mobile telephone (1) is elliptical shape long in the longitudinal direction, in view of the side, and this ellipse is cut diagonally into two parts. One of such two parts is called the first housing (100) and the other is called the second housing (200).

In other words, the first housing (100) is thick on the hinge section side and thin (wedge-like) on the other end. Contrarily, the second housing (200) is thin (wedge-like) on the hinge section side and thick on the other end. This structure can provide wider spaces on both sides (up and down) of the lateral sides.

These areas are wide enough to provide the camera shutter (107), the subsidiary loudspeaker section (108), the mode selection switch (208), and the OPEN button (209).

However, the above elliptic structure is not enough to provide inner spaces for components of the mobile telephone. To provide enough internal spaces, this embodiment gives a great curvature to each of the inner surfaces (101 and 202). This makes both first and second housings have uniform thickness. In other words, this embodiment reduces the thickness (down to a preset thickness) toward the inside from the both lateral sides in the thicker portion of the housings, and increases the thickness (up to a preset thickness) toward the inside from the both lateral sides in the thinner portion of the housings.

With this structure the housings can provide a preset thickness optimum to component installation together with the characteristic wedge-like ends.

Referring to FIG. 4, the mobile telephone of this embodiment in the second status can be held in a horizontal posture (landscape posture) to shoot. FIG. 4 shows external views of the mobile telephone which is held in a landscape posture. FIG. 4(c) shows the appearance of the mobile telephone viewed from an object to be shot. FIGS. 4(a), (b), (d), (e), and (f) respectively show plan view, left side view, right side view, bottom view, and rear view thereof in that order.

Figure 4A:
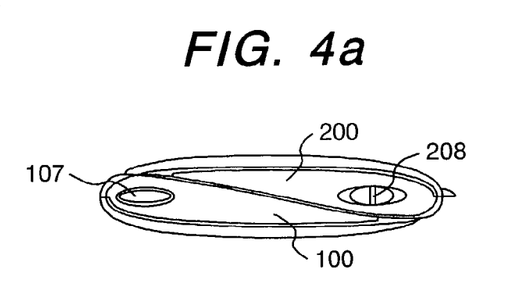
FIG. 4 shows external views of the mobile telephone whose first casing is closed.
Figure 4B:
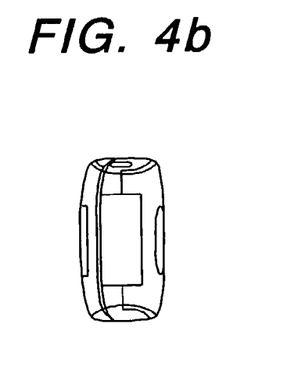

Referring to FIG. 4(a), the embodiment in the second status (in a landscape posture) has the shutter switch (107) and the mode selection switch on the top thereof. Therefore, when the user holds the mobile telephone at both longitudinal ends (see FIG. 6), the user can operate these two switches by his or her forefingers.

Figure 4C:
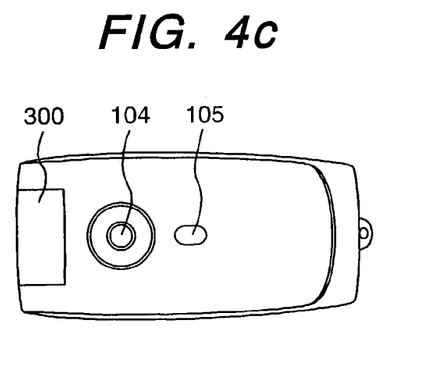

Referring to FIG. 4(c), the first housing (200) has a camera flash (105) in the longitudinal center of the housing, and a camera section (104) between the hinge section (300) and the camera flash (105). Referring to FIG. 4(f), the subsidiary display section (201) is placed behind the camera section (104). In other words, the subsidiary display section (201) is in alignment with the optical axis of the camera section (104). With this, the user can shoot objects easily and correctly. Further as the camera section (104) is a little away from the center towards the hinge section (300), the camera section (104) is close to the single hand that holds the mobile telephone in the first status. Thereby, picture movement can be eliminated. Further, as the camera section can be provided in the thicker portion of the hinge section (300), efficiency of component installation and the degree of compactness can be increased.

When the mobile telephone of this embodiment is turned on, the mobile telephone initially enters the Phone mode. In the second status, the subsidiary display section (201) shows a communication or call reception status. In this status, the Still Picture or Motion Picture mode can be selected by operating the mode selection switch (208). When this switch is operated, the control section (10) turns on the camera section (104) and checks the status of the internal changeover switch (21). When the switch (21) is set to "Second status", the control section causes the subsidiary display section (201) to display a shot image. When the shutter switch (107) is operated in the Still Picture mode, the control section (10) records a still image, displays a shot image on the subsidiary display section for a preset time period, and re-displays the displays the picture image shot by the camera section (104). When the shutter switch (107) is operated in the Motion Picture mode, the camera section starts shooting. When the user operates the shutter switch (107) again, the camera section stops shooting. During shooting, the subsidiary display section (201) shows a picture image shot by the camera section.

Figure 4E:
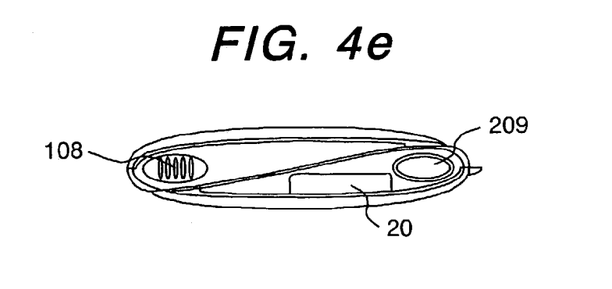
Figure 4F:
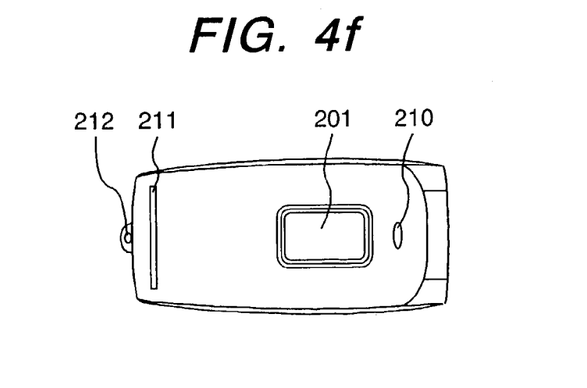

Referring to FIG. 4(e), the external connector (20) is covered with a detachable lid. Referring to FIG. 4(c), a projection in the right end of the housing is used to connect a strap by means of the opening of the projection.

By opening the first housing of the mobile telephone in the second status, the mobile telephone enters the first status (see FIG. 5). In this first status, the mobile telephone exposes the main display section (102) and the operation section (205) that are hidden in the second status. The function keys (204) constituting the operation section comprise a decision key (220) in the center, cursor control keys (221) around the decision key (220), and a plurality of selection keys (222) around the cursor control keys (221). The cursor control keys (221) have a ring-shaped operation surface which can be tilted in eight directions. When a part of the operation ring (221) is pressed to tilt, the cursor (selection pointer) can move in the selected direction on the main display section (102). After a menu item is selected by the cursor, the decision key is pressed for execution.

The selection keys (222) comprises a Mail key (222a), an Internet key (222b), and a pair of software keys (222c and 222d). These software keys (222c and 222d) are usually used to select Mail and Internet, but when a particular function is selected, these keys and the decision key (220) are corresponding to three switches that are displayed on the bottom of the main display section (102).

The ten-key pad (203) comprises upper subsidiary function keys (223) and numeric/character keys (224) thereunder. Further, the subsidiary function keys (223) comprise a Power ON/OFF key (223a), a Clear key (223b), and a Send key (223c).

In this embodiment, operations and communication can be executed by the operation section (225). For example, when the user operates the function key (204), a menu appears in the man display section (102). The user can select a function, execute it or set various items from the menu. It is needless to say that the camera function can be selected from the menu.

In this embodiment, the mode selection switch (208) can change modes between Still Picture and Motion Picture. Initially, the mode of this embodiment is set to the Phone mode. Therefore, when the selection switch (208) is operated from the Phone mode, the control section (10) turns on the camera section (104) and checks the status of the internal changeover switch (21). When the internal changeover switch (21) indicates the first status, the control section turns a shot picture image by 90 degrees and displays it on the main display section (102). Therefore, the user can use the camera function also in the first status. The camera function is selected by one of function keys (that are a pair of software keys (222c and 222d) and a decision key (220)) displayed on the bottom of the screen of the main display section. For example, a Photo key can be assigned to the decision key (220).

Referring to FIG. 1 and FIG. 6, how the mobile telephone (1) of this embodiment is operated and used. First, the Power ON/OFF key (203) is operated to turn on the mobile telephone (1). When the mobile telephone is turned on, the Phone mode is initially set and the mobile telephone is ready to receive a call.

In the second status, the control section (10) checks the setting status of the internal change-over switch, turns off the main display section (102), turns on the subsidiary display section (201), sets the subsidiary display section (201) in the Phone mode, and makes the mobile telephone ready to receive a call. When a mail or call comes in this status, the control section (10) causes the subsidiary loudspeaker to generate a preset reception melody, causes the status indicator section (210) to light, and displays a call/mail reception on the subsidiary display section (201). When the first housing (100) of the mobile telephone is opened in this status, (the mobile telephone enters the first status and) the control section (10) knows this status by the setting status of the internal selection switch (21), turns off the subsidiary display section (201), turns on the main display section (102), and displays a call/mail reception on the main display section. The user can use the Send key (223c) to receive the call or the function key (204) to display the mail on the main display section (102).

Further, this embodiment has the subsidiary display section (201) on the secondary housing (200). In other words, the subsidiary display section (201) and the operation section (205) are on the opposite sides of the second housing (200). Generally, this foldable type of mobile telephone, in the second status, is placed on a tabletop or the like with the subsidiary display section (201) faced up. When a call comes in this status, the user takes up the second housing (200) by his or her hand and can open the first housing (100) by the other hand. Therefore, the user can talk without changing hands to hold the mobile telephone (1). In other words, if the subsidiary display section (201) is provided on the first housing (100), the user must first hold the first housing, then hold the second housing to open the first housing (100). This hand-changing step is excess and unnecessary. This embodiment does not require this hand-changing step. Further, the user can quickly pick up the mobile telephone by a single hand from the tabletop or the like, because the outer surface (103) having the camera (104) is curved and has a plenty of space between the phone body and the tabletop.

The user of this embodiment in the second status can use the camera function by operating the mode-selection switch (208). In the second status, the user can hold the mobile telephone at both longitudinal ends thereof and operate the mode-selection switch (208) easily by his or her right forefinger to set the Still Picture or Motion Picture mode. Further, the user can operate the shutter switch (107) by his or her right forefinger to shoot still pictures and start or stop shooting motion pictures. Picture blurring can be eliminated during shooting when the mobile phone body is held by two hands.

Also in this second status, the user can shoot while monitoring the picture image through the camera lens on the subsidiary display section (see FIG. 6(b)) and thus the user can select optimum images to shoot. Additionally, this embodiment is equipped with a camera flash (105). The camera flash is made of an LED light source or the like and flashes every time the shutter switch (107) is operated in the Still Picture mode or while shooting is in progress in the Motion Picture mode.

Although this embodiment is used to shoot mainly in the second status, the embodiment can use the camera function also in the first status. The user can select the Still Picture or Motion Picture mode by operating the mode selection switch (208) in the first status. In the second status, the user hold the second housing by his or her single hand, and shoot still or motion pictures through the camera section (104) which is placed opposite to the main display section (102). Although the shutter switch (107) of this embodiment is used to shoot, any of the software keys (222c and 222d) and the decision key (220) can be used by a Camera key (when assigned so). This assignment can be set on a setting screen which is hierarchically under the menu screen. With this, the user can operate the key by his or her thumb of the hand that holds the second housing (200).

The above embodiment has the operation section (205) and the subsidiary display section (201) on the opposite surfaces of the second housing (200). However, it is to be understood that the invention is not intended to be limited to this specific embodiment. For example, the first housing can have the main display section (102) on the inner surface (101) which is invisible when the housing is closed, and can have the subsidiary display section (201) on the outer surface (102) which is opposite to the inner surface (101). The second housing (200) can have an operation section (205) comprising a ten-key pad and function keys on the inner surface (202) which is invisible when the housing is closed, and can have the camera section (104) on the outer surface (206) which is opposite to the inner surface (202). In accordance with this embodiment, the first housing can be made thinner. It is also possible to open the first housing while the mobile telephone is in the second status, and it is possible to shoot in the landscape (horizontal) posture while the mobile telephone is in the first status. In this shooting posture, the user can use this great main display section to shoot. In this case, the main display section need not be turned by 90 degrees.

(Effects of the Invention)

The present invention can provide a mobile telephone which can offer an optimum shooting posture and optimum storage ability.

What is claimed is:

1. A mobile telephone comprising a first housing equipped with a plurality of operational switches, a second housing with a main display section, and a hinge means which pivotally connects said first and second housings and enables longitudinal folding thereof, wherein,
   a main display section and an operation section containing a set of a ten-key pad and functional keys, which are respectively provided on the inner surfaces of said first and second housings which are invisible when the housings are folded,
   a subsidiary display section and a camera section are respectively provided on the outer surfaces opposite to said inner surfaces of said housings,
   a shutter switch and a changeover switch which switches between Phone and Camera modes are provided on the outer surface of said housings, and
   said subsidiary display section displays a communication status in the Phone mode and a picture image shot by said camera section in the Camera mode,
   wherein said shutter switch is provided on one side of a longer side of said first or second housing, and said subsidiary display section is in the normal landscape view when the mobile telephone is held with the longer side thereof upward.

2. A mobile telephone comprising a first housing equipped with a main display section, a second housing with a plurality of operational switches, and a hinge means which pivotally connects said first and second housings and enables longitudinal folding thereof, wherein
   said first housing is equipped with the main display section on the inner surface which is invisible when the housings are closed, and equipped with a camera section on the outer surface opposite to the inner surface,
   said second housing is equipped with an operation section containing a set of a ten-key pad and functional keys on the inner surface which is invisible when the housings are closed, and equipped with a subsidiary display section on the outer surface opposite to the inner surface,
   a shutter switch and a change-over switch which switches between Phone and Camera modes are provided on the outer surfaces which are exposed when said first and second housings are closed,
   said subsidiary display section is in the normal landscape view when the longitudinal axis of said mobile telephone is held horizontal, and said subsidiary displays a communication status in the Phone mode and a picture image shot by said camera section in the Camera mode, and
   wherein said shutter switch is provided on one side of a longer side of said first or second housing, and said subsidiary display section is in the normal landscape view when the mobile telephone is held with the longer side thereof upward.

3. A mobile telephone comprising a first housing equipped with a main display section, a second housing with a plurality of operational switches, and a hinge means which pivotally connects said first and second housings and enables longitudinal folding thereof, wherein
   said first housing is equipped with the main display section on the inner surface which is invisible when the housings are closed, and equipped with a subsidiary display on the outer surface opposite to the inner surface,
   said second housing is equipped with an operation section containing a set of a ten-key pad and functional keys on the inner surface which is invisible when the housing are closed, and equipped with a camera section on the outer surface opposite to the inner surface,
   a shutter switch and a change-over switch which switches between Phone and Camera modes are provided on the outer surfaces which are exposed when said first and second housings are closed, and
   said subsidiary display section is in the normal landscape view when the longitudinal axis of said mobile telephone is held horizontal, and said subsidiary displays a communication status in the Phone mode and a picture image shot by said camera section in the Camera mode,
   wherein said shutter switch is provided on one side of a longer side of said first or second housing, and said subsidiary display section is in the normal landscape view when the mobile telephone is held with the longer side thereof upward.

* * * * *